(12) United States Patent
Xie

(10) Patent No.: US 7,172,280 B1
(45) Date of Patent: Feb. 6, 2007

(54) SPECTACLE SET HAVING ADD-ON MAGNETIC ADAPTOR PADS FOR SHELTER FRAME

(76) Inventor: Yiling Xie, 900 Arcadia Ave, # 8, Arcadia, CA (US) 91007

( * ) Notice: Subject to any disclaimer, the term of this patent is extended or adjusted under 35 U.S.C. 154(b) by 0 days.

(21) Appl. No.: 11/162,011

(22) Filed: Aug. 25, 2005

(51) Int. Cl.
*G02C 9/00* (2006.01)
(52) U.S. Cl. .......................................... 351/47; 351/57
(58) Field of Classification Search ................ 351/47, 351/48, 57, 58, 44, 41
See application file for complete search history.

(56) References Cited

U.S. PATENT DOCUMENTS 6,402,318 B1 * 6/2002 Xiao ............................ 351/57
6,540,348 B1 * 4/2003 Xie ............................... 351/57
6,783,233 B2 * 8/2004 Xie ............................... 351/47

* cited by examiner

*Primary Examiner*—Hung Xuan Dang
(74) *Attorney, Agent, or Firm*—Jen-Feng Lee, Esq.

(57) ABSTRACT

A spectacles set includes a primary spectacle frame and a detachable shelter frame configured for mounting in front of the primary spectacle frame. The detachable shelter frame includes a shelter frame for supporting two auxiliary lenses and a pair of magnetic attaching arrangements connected to the shelter frame. A pair of magnetic adaptor pads are used to attach to the nose support, or near the nose support portion, of the primary spectacle frame, so that the magnetic attaching arrangements can be applied to a primary spectacle frame even though the primary spectacle frame was not originally designed or produced to match with a shelter frame.

3 Claims, 5 Drawing Sheets

SPECTACLE SET HAVING ADD-ON MAGNETIC ADAPTOR PADS FOR SHELTER FRAME

RELATED APPLICATIONS/PATENTS

The present application is related to, but is distinct from, the following patents of the same inventor:

| | |
|---|---|
| 1. U.S. Pat. No.: 6,382,787 | Issue Date: May, 7 2002 |
| 2. U.S. Pat. No.: 6,540,348 | Issue Date: Apr., 1 2003 |
| 3. U.S. Pat. No.: 6,729,723 | Issue Date: May, 5 2004 |
| 4. U.S. Pat. No.: 6,783,233 | Issue Date: Aug., 31 2004 |
| 5. U.S. Pat. No.: 6,761,449 | Issue Date: Jul., 13 2004 |
| 6. U.S. Pat. No.: 6,834,951 | Issue Date: Dec., 28 2004 |
| 7. U.S. Pat. No.: 6,893,123 | Issue Date: May, 17 2005 |
| 8. U.S. Pat. No.: 6,913,355 | Issue Date: Jul., 5 2005 |

FIELD AND BACKGROUND OF THE INVENTION

The present invention relates to spectacle frame, and more particularly to a spectacles set which allows a detachable shelter frame to be mounted on a primary spectacle frame by means of magnetic attraction. The add-on adaptor pads of present invention increases the versatility of a primary spectacle frame for receiving a shelter frame, even when the primary spectacle frame was not produced or configured to accept the attachment of shelter frame by means of magnetic attraction.

Shelter frames are widely used today. A conventional shelter frame, such as clip-on sunglasses, comprises a plurality of clipping for detachably mounted on a pair of shortsighted or farsighted glasses so that people do not need to carry and pay for another pair of shortsighted or farsighted sunglasses. However, the metal-made clipping claws may scratch the lenses of the primary eyeglasses during the attaching operation. Also, the wearers need to use both hands to align and engage the conventional clip-on sunglasses on the primary eyeglasses for setting onto correct position properly. It is troublesome and dangerous for a wearer to use his or her hands to wear such clip-on sunglasses on the regular glasses while he or she is driving.

In order to solve the problem of the above-mentioned clip-on sunglasses, magnetic attachment is recently introduced into the eyeglasses industry, such as U.S. Pat. Nos. 5,416,537, 5,568,207, 5,642,177, 5,737,054, and 5,975,691. For example, in U.S. Pat. No. 5,568,207, a primary pair of magnet members is affixed on two side extensions of a primary spectacle frame respectively. A shelter frame, such as a pair of sunglasses, includes a pair of arms for resting over the upper side extensions for preventing the shelter frame from moving downward or sideways relative to the primary spectacle for engaging with the primary magnet members of the primary spectacle frame so as to stably attach the shelter frame to the primary spectacle frame. However, the users have to align two pairs of magnet members. If the auxiliary magnet members of the sunglasses are misaligned with the primary magnet members of the primary spectacle frame, the sunglass will fall down from the primary spectacle frame easily.

Moreover, the magnet members are firmly affixed to the spectacle frame of the primary spectacle. If the primary spectacles frame is accidentally bent out of its original shape, the shelter frame cannot be precisely mounted on the primary spectacle by means of the magnet attachment.

Furthermore, the spectacle frame of the primary spectacle must be designed, configured, produced or altered to fit the magnet members thereto such that the magnet members will not destroy the aesthetic appearance of the primary spectacle, or the overall aesthetic appearance of the primary spectacle frame having the shelter frame mounted on.

OBJECT AND SUMMARY OF THE PRESENT INVENTION

A main object of the present invention is to provide a universal means for spectacles set to attach a detachable shelter frame by means of a pair of add-on pads, even though the primary spectacle set is not designed or produced with the magnetic attachment mechanism.

Another object of the present invention is to provide a spectacles set, wherein the magnet engaging arrangement is hidden in the add-on pads and can be removed when the shelter frame is not needed (for example, sun-blocking is not needed during night time), so as to keep the aesthetic appearance of the primary spectacle frame.

Another object of the present invention is to provide a spectacles set, wherein, after the attachment of the add-on pair of adaptor pads, the wearer may merely use one hand to attach or detach the detachable shelter frame during exercising or driving.

Another object of the present invention is to provide a spectacles set which does not need to change the original structural design of the primary spectacle frame.

Another object of the present invention is to provide a spectacles set with detachable shelter frame, wherein no magnet is needed to embed into the primary spectacle frame such that no magnetic field is generated around the primary spectacle frame to affect the wearer's health while he or she normally wears the primary spectacle frame.

Accordingly, in order to accomplish the above objects, the present invention provides a spectacles set comprising a primary spectacle frame, a detachable shelter frame for mounting in front of the primary spectacle frame, and a pair of add-on adaptor pads for mounting shelter frame to the primary spectacle frame.

The primary spectacle frame comprises a frame body for mounting a pair of lenses in position, wherein the frame body comprises a primary bridge connected between the two lenses, two nose supports attached at two inner sides of the lenses respectively, and two side extensions provided at two outer sides of the lenses for coupling a pair of temples respectively.

The detachable shelter frame comprises a shelter frame for supporting two auxiliary lenses and a pair of magnetic attaching arrangements connected to the shelter frame wherein each of the magnetic attaching arrangements comprises a supporting arm extending rearwardly from an inner side of the auxiliary lens of the shelter frame towards the respective magnetic holder for riding on the primary bridge so as to securely mount the shelter frame in front of the primary spectacle frame and a magnetic seat which is connected to the supporting arm and extended to magnetically attach the respective magnetic holder of the primary spectacle frame so as to hold the shelter frame on the primary spectacle frame in position.

A pair of add-on magnetic adaptor pads are configured or structure to be fitted to the nose support section of the primary spectacle frame. On the surface of said pair of adaptor pads is a pair of magnets, or other metals having magnetic attraction to work in attachment relationship with the magnets from the detachable shelter from.

DETAILED DESCRIPTION OF THE PREFERRED EMBODIMENT

Figure 1:
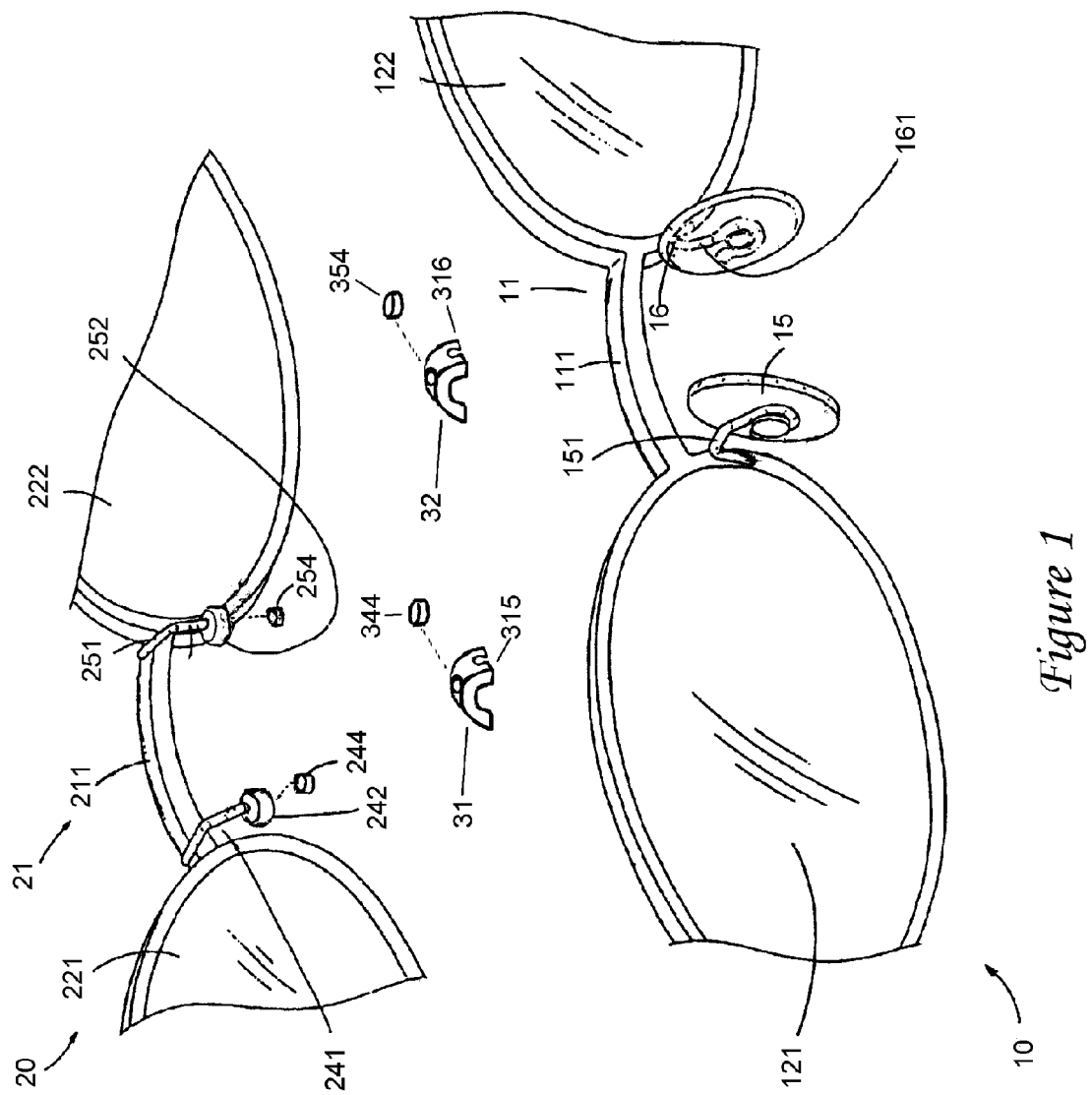
FIG. 1 is a partial perspective view of a spectacles set comprising a primary spectacle frame, a detachable shelter frame, and a pair of add-on magnetic adaptor pads, according to a preferred first embodiment of the present invention.

Referring to FIG. 1 of the drawings, a spectacles set according to a first preferred embodiment of the present invention is illustrated, wherein the spectacles set comprises a primary spectacle frame 10 and a detachable shelter frame 20 for detachably mounting in front of the primary spectacle frame 10.

The primary spectacle frame 10, such as a conventional spectacle frame, comprises a frame body 11 for mounting a pair of lenses 121, 122 in position. The frame body 11 comprises a primary bridge 111 connected between the two lenses 121, 122 respectively, two nose supports 15, 16 are attached via two support arms 151 and 161, to edge of frame body 11 close to two inner sides of the lenses 121, 122 respectively.

The shelter frame 20 has a frame body 21. Central bridge 211 connects the two sides of the shelter frame holding the two auxiliary lenses 221 and 222. Two attaching arms 241, 251 extend from the central bridge 211 rearwardly and each has a housing 242, 252 to contain a magnet 244, 254.

Two add-on magnetic adaptors, 31 and 32, each is shaped to define a lower groove 315, 316 to be fitted onto the support arms 151, 161 of the primary spectacle frame. On the top surface of the two add-on adaptors, two magnetic pieces 344 and 354 are seated within. 344 and 354 can be magnets or they can be other metal as long as they have magnetic attraction ability to work with the magnets 244, 254 on the shelter frame 20.

Figure 2:
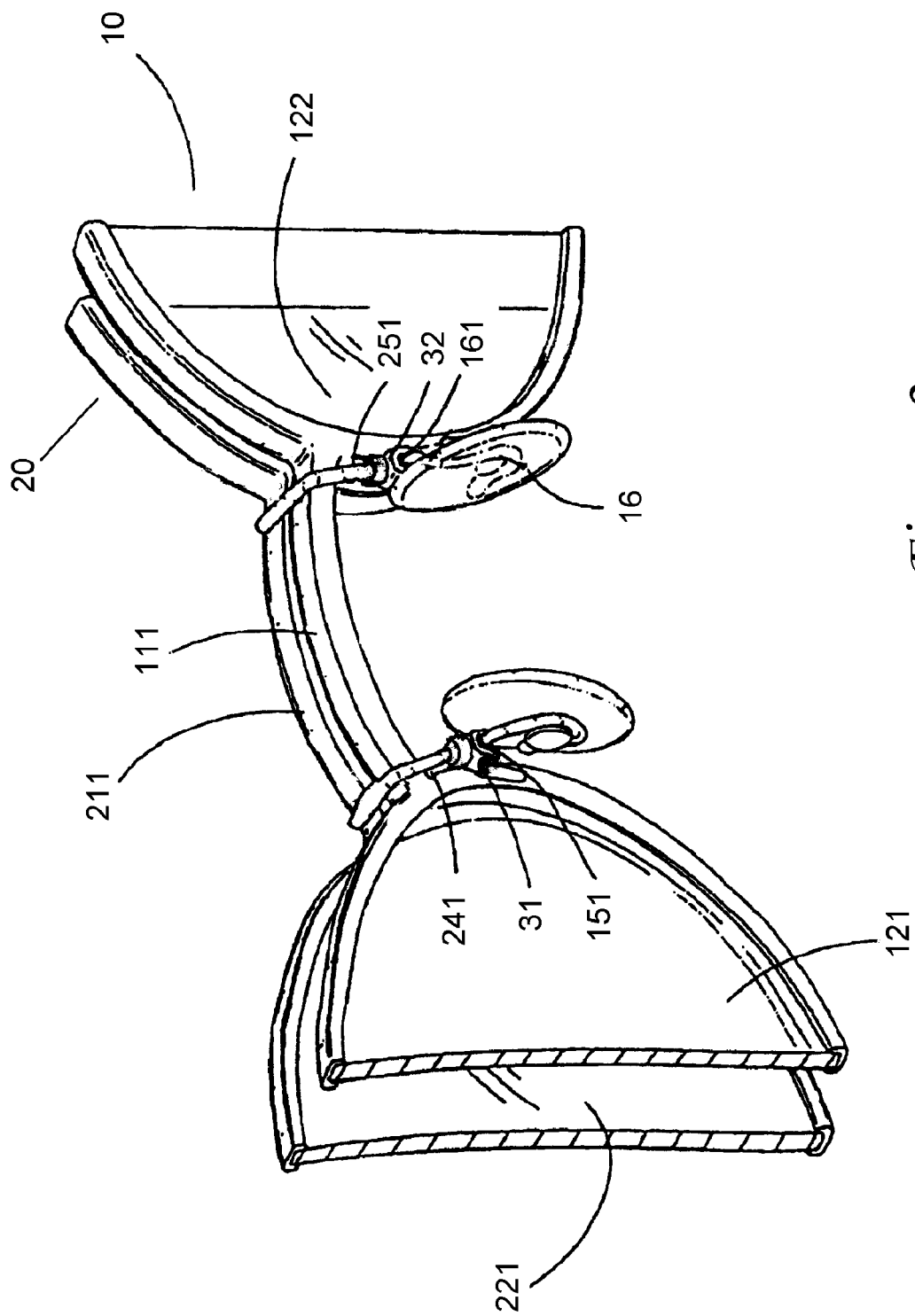
FIG. 2 is a partial enlarged perspective view of a shelter framed mounted to the primary spectacle frame, having the pair of add-on magnetic adaptor pads in place, according to the above first preferred embodiment of the present invention.

As shown in FIG. 2, the shelter frame 20 has been mounted to the primary spectacle frame 10, by fitting the pair of adaptor pads 31, 32 over the over the support arm 151, 161 of the primary spectacle frame 10.

Figure 3:
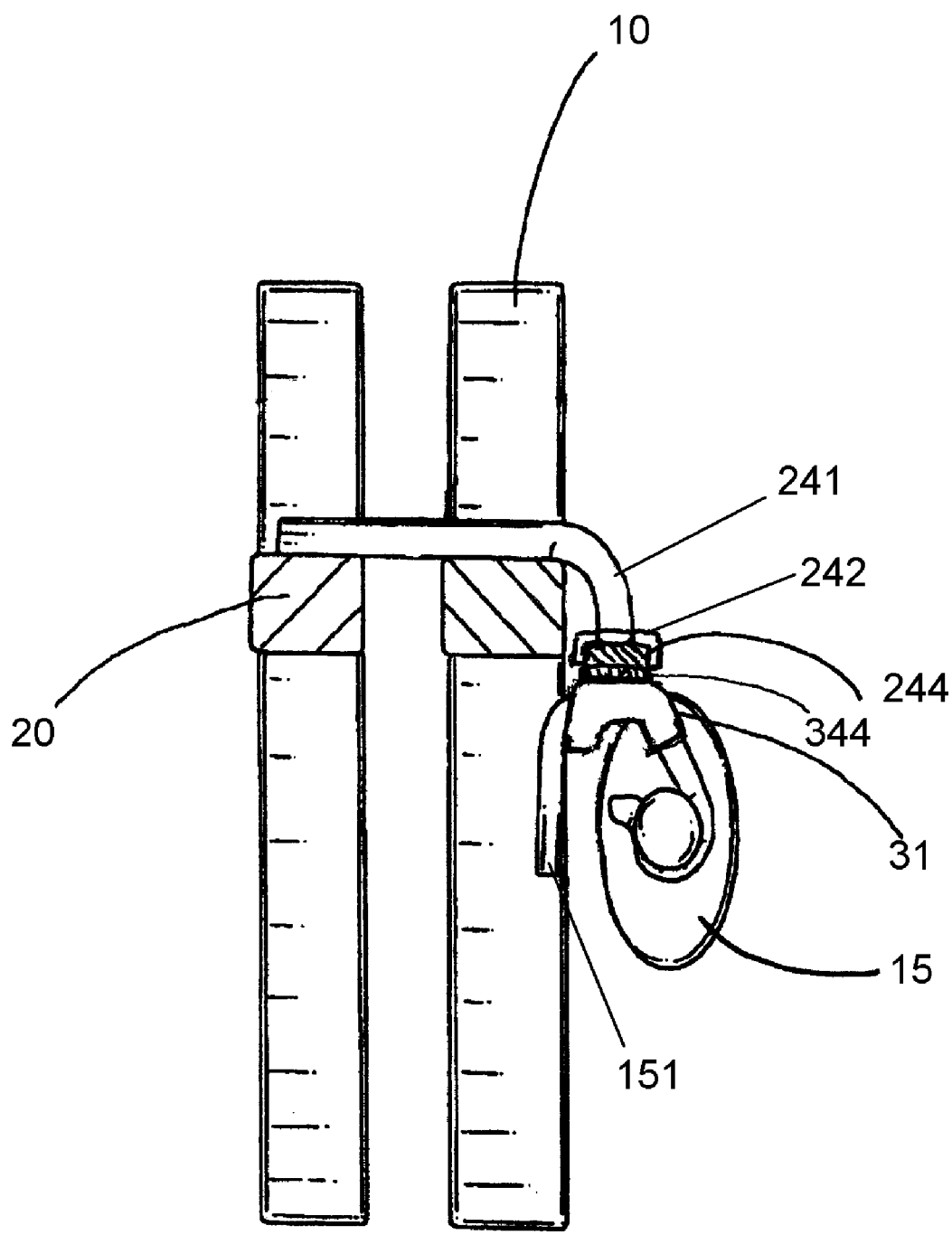
FIG. 3 is a sectional view of a shelter framed mounted to the primary spectacle frame, having the pair of add-on magnetic adaptor pads fitted in place, according to the above first preferred embodiment of the present invention.

As shown in FIG. 3, the shelter frame 20 is mounted to the primary spectacle frame 10, looking from a sectional view. Magnet 244 is attached to magnetic piece 344, which may be a magnet or a metal having magnetic attraction. Adaptor pad 31 is fitted over on top of nose support arm 151, by virtue of the adaptor pad's lower groove 315 as showed and defined in FIG. 1.

Figure 4:
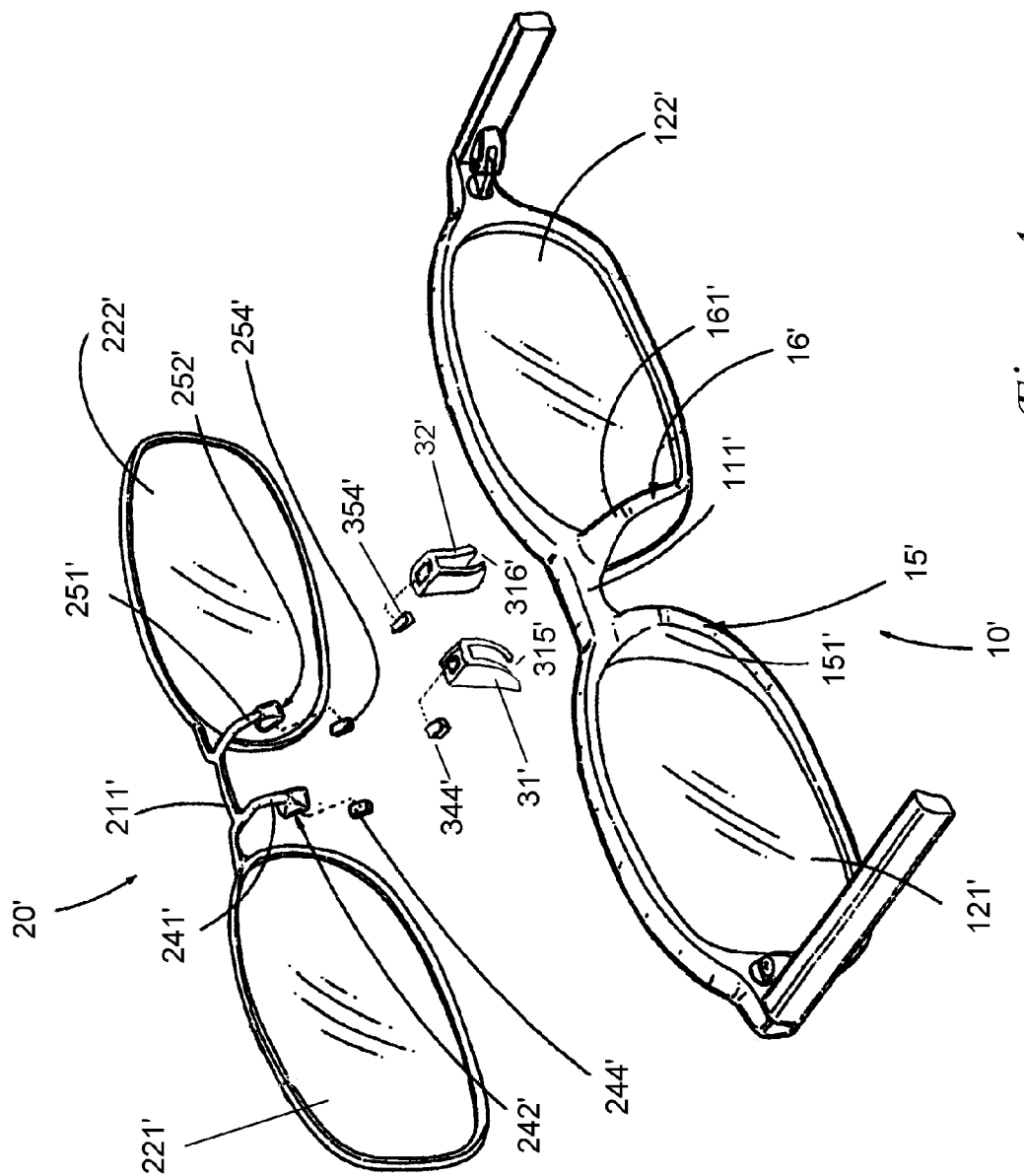
FIG. 4 is a perspective view of a spectacles set comprising a primary spectacle frame, a detachable shelter frame, and a pair of add-on magnetic adaptor pads, according to a preferred second embodiment of the present invention.
Figure 5:
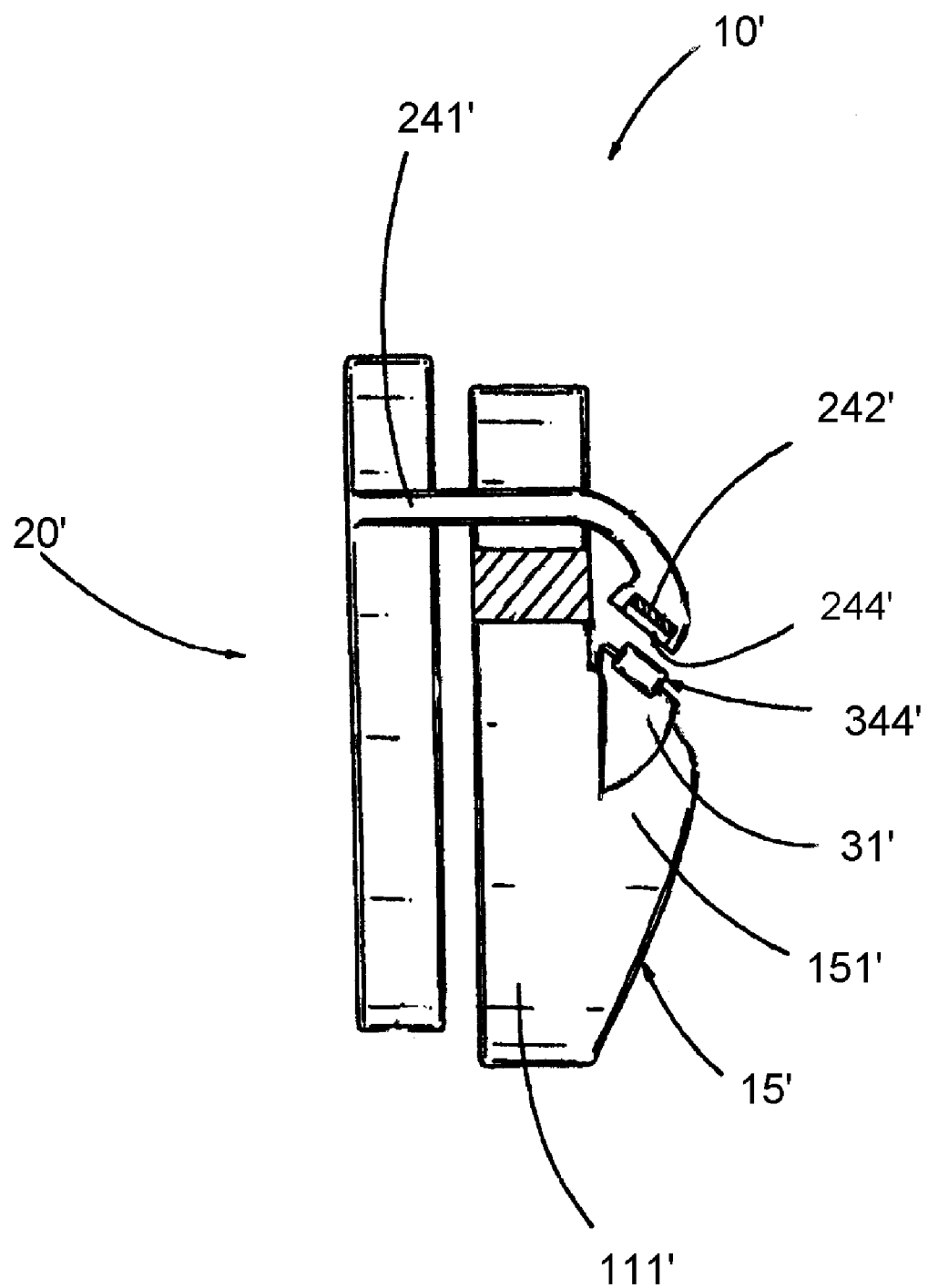
FIG. 5 is a sectional view of a shelter frame mounted to the primary spectacle frame, having the pair of add-on magnetic adaptor pads fitted in place, according to the above second preferred embodiment of the present invention.

FIGS. 4 and 5 show the second embodiment of present invention wherein the nose support of a primary spectacle frame is shaped as to be part of the integral portion of the frame body, instead of having separate structural elements, such as thin wire with additional parts, nose supports 15, 16 and support arms 151, 161, as in the case of FIGS. 1 through 3.

As shown in FIG. 4, the nose support 15', 16' is integral part of the primary spectacle frame 10. The add-on adaptor pads 31' and 32' can also be made to use on this kind of primary spectacle frame for purpose of attaching a shelter frame 20' by the use of magnetic arrangement.

As shown in FIG. 4, the portion, 151' and 161', of nose support 15', 16' will be used to fit the adaptor pads 31' and 32', wherein the lower groove of said pads are shaped and defined as shown by 315' and 316'.

On top of the add-on adaptor pads, two magnetic pieces 344' and 345' are housed thereon. As explained earlier, 344' and 345' may or may not be magnets. As long as 344' and 345' have the magnetic attraction to work with the magnets 244' and 254' on the shelter frame 20', then those would serve the purpose.

On the shelter frame 20', magnets 244' and 254' are securely placed in the housing 242', 252 of the respective attaching arms 241' and 251', extending out from the central bridge 211' of the shelter frame.

In FIG. 5, the sectional view shows that the shelter frame 20' is mounted to the primary spectacle frame 110'. Magnet 244' is attached to magnetic piece 344', which may be a magnet or a metal having magnetic attraction. Adaptor pad 31' is fitted over on top of nose support portion 151', by virtue of the adaptor pad's lower groove 315' as showed and defined in FIG. 4.

Since the primary spectacle frame according to the embodiment and its alternatives may not need to use any magnet, as long as the pieces have magnetic attraction capacity, no magnetic field is produced around the primary spectacle frame so that the user is able to wear the primary spectacle frame as usually without worrying any adverse health effects that could result from the constant existence of the magnetic field.

While the foregoing description and diagram describe the preferred embodiment and its alternatives, it should be appreciated that certain obvious modifications, variations, and substitutions may be made without departing from the spirit and scope of the present invention, such as the shape and size of the magnetic seat and the magnetic holder.

What is claimed is:

1. A spectacles set, comprising a primary spectacle frame, a detachable shelter frame, and a pair of add-on detachable adaptor pads:

said primary spectacle frame comprising a frame body for mounting a pair of lenses in position, wherein said frame body comprises a primary bridge connected between said two lenses, two nose supports attached at two inner sides of said lenses respectively, two magnetic holders, each of which has a magnetic attraction ability, are provided at said two nose supports respectively, and two side extensions provided at two outer sides of said lenses for coupling a pair of temples respectively;

said detachable shelter frame comprising a shelter frame for supporting two auxiliary lenses and a pair of magnetic attaching arrangements connected to said shelter frame wherein each of said magnetic attaching arrangements comprises a supporting arm extending rearwardly from an inner side of the auxiliary lens of said shelter frame towards the respective magnetic holder so as to securely mount said shelter frame in front of said primary spectacle frame and a magnetic seat which is connected to said supporting arm and extended to magnetically attach said respective magnetic holder of said primary spectacle frame so as to hold said shelter frame on said primary spectacle frame in position; and, each said adaptor pads has a lower groove that is shaped to fit the nose support arm or portion of the nose support on the primary spectacle and further has a magnet or a metal having magnetic attraction sitting on top for engageably receiving the magnetic arrangement on the shelter frame.

2. The spectacles set, as recited in claim 1, wherein each of said two nose supports on the primary spectacle has a nose supporting arm shaped like wire or tube, so as to define the lower groove on said add-on adaptor pads accordingly.

3. The spectacles set, as recited in claim 1, wherein each of said two nose supports is integral part of the primary spectacle, so as to define the lower groove on said add-on adaptor pads accordingly.

* * * * *